United States Patent
Oh

(10) Patent No.: US 10,386,016 B2
(45) Date of Patent: Aug. 20, 2019

(54) MULTIPLE APPLICATION ORIFICE STEAM TRAP APPARATUS

(71) Applicant: Soon Ung Oh, Seoul (KR)

(72) Inventor: Soon Ung Oh, Seoul (KR)

( * ) Notice: Subject to any disclaimer, the term of this patent is extended or adjusted under 35 U.S.C. 154(b) by 12 days.

(21) Appl. No.: 15/519,665

(22) PCT Filed: Oct. 15, 2015

(86) PCT No.: PCT/KR2015/010898
§ 371 (c)(1),
(2) Date: Apr. 17, 2017

(87) PCT Pub. No.: WO2016/060496
PCT Pub. Date: Apr. 21, 2016

(65) Prior Publication Data
US 2017/0248273 A1    Aug. 31, 2017

(30) Foreign Application Priority Data

Oct. 16, 2014   (KR) ........................ 10-2014-0139607

(51) Int. Cl.
*F16T 1/38*   (2006.01)
*F16T 1/12*   (2006.01)
*F16T 1/00*   (2006.01)

(52) U.S. Cl.
CPC .................. *F16T 1/12* (2013.01); *F16T 1/00* (2013.01); *F16T 1/38* (2013.01)

(58) Field of Classification Search
CPC ....... F16T 1/00; F16T 1/12; F16T 1/38; F16T 1/48

See application file for complete search history.

(56) References Cited

U.S. PATENT DOCUMENTS

| | | | | | |
|---|---|---|---|---|---|
| 4,468,962 | A | * | 9/1984 | Keech | G01F 15/08 73/200 |
| 4,888,978 | A | * | 12/1989 | Yumoto | F16T 1/48 73/40 |
| 5,992,436 | A | * | 11/1999 | Hellman | F16T 1/48 137/1 |

(Continued)

FOREIGN PATENT DOCUMENTS

JP       02292599 A   * 12/1990

OTHER PUBLICATIONS

Machine Translation for JP H02292599.*

*Primary Examiner* — Ian G Paquette
(74) *Attorney, Agent, or Firm* — Renner, Kenner, Greive, Bobak, Taylor & Weber

(57) ABSTRACT

A multiple application orifice steam trap apparatus of the present invention includes: an orifice steam trap that has an orifice hole and is connected to a live steam delivery pipe to prevent leakage of live steam and discharge only condensate water; a back pressure adjustment unit that is connected to the rear end of the orifice steam trap from which condensate water is discharged and adjusts back pressure of the orifice steam trap; and a meter that is disposed at any one of or both between the front of the back pressure adjustment unit and the orifice steam trap or at the rear of the back pressure adjustment unit and measures any one or both of temperature and pressure at any one or both of the front and rear of the back pressure adjustment unit.

13 Claims, 6 Drawing Sheets

(56) References Cited

U.S. PATENT DOCUMENTS

| | | | |
|---|---|---|---|
| 8,851,100 B2* | 10/2014 | Petzoldt | F01K 9/00 |
| | | | 137/115.01 |
| 2003/0074981 A1* | 4/2003 | Rebik | F16K 31/26 |
| | | | 73/861.57 |

* cited by examiner

MULTIPLE APPLICATION ORIFICE STEAM TRAP APPARATUS

TECHNICAL FIELD

The present invention relates to a multiple application orifice steam trap apparatus and, more particularly, to a multiple application orifice steam trap apparatus that is freely applied to any places with restrictions in installation environment and effectively prevents leakage of steam that is produced when condensate water is discharged.

BACKGROUND ART

In general, apparatuses using steam or live steam delivery pipes (steam pipes) are equipped with a steam trap for discharging drain that is produced from steam that is supplied through a pipe under a predetermined pressure due to low outside temperature. In the related art, there has been disclosed "Orifice steam trap" in Korean Patent No. 10-1189706 by the applicant(s).

According to the related art, accurate diameters of orifice holes suitable for installation places are selected by finding out the difference between the pressure at the front end of a steam trap and the back pressure remaining at the rear end of the steam trap, that is, a pressure difference and calculating pressure and condensate water to be generated. Therefore, according to the related art, it is troublesome to calculate the amount of condensate water to be produced and select a hole of an orifice suitable for the amount.

DISCLOSURE

Technical Problem

An object of the present invention is to provide a multiple application orifice steam trap apparatus that can be installed at any places without restrictions in installation environments.

The technical subjects to implement in the present invention are not limited to the technical problems described above and other technical subjects that are not stated herein will be clearly understood by those skilled in the art from the following specifications.

Technical Solution

A multiple application orifice steam trap apparatus of the present invention includes: an orifice steam trap that has an orifice hole and is connected to a live steam delivery pipe to prevent leakage of live steam and discharge only condensate water; a back pressure adjustment unit that is connected to the rear end of the orifice steam trap from which condensate water is discharged and adjusts back pressure of the orifice steam trap; and a meter that is disposed at any one of or both between the front of the back pressure adjustment unit and the orifice steam trap or at the rear of the back pressure adjustment unit and measures any one or both of temperature and pressure at any one or both of the front and rear of the back pressure adjustment unit.

In detail, the back pressure adjustment unit may be a valve.

The meter may include any one or both of a temperature meter and a pressure meter to measure any one or both of temperature and pressure.

The temperature meter and the pressure meter may be sequentially disposed between the front of the back pressure adjustment unit and the orifice steam trap to measure temperature and pressure at the front of the back pressure adjustment unit.

The temperature meter and the pressure meter may be sequentially disposed behind the back pressure adjustment unit to measure temperature and pressure at the rear of the back pressure adjustment unit.

The temperature meter may be disposed between the front of the back pressure adjustment unit and the orifice steam trap to measure temperature at the front of the back pressure adjustment unit.

The temperature meter and the pressure meter may be sequentially disposed behind the back pressure adjustment unit to measure temperature and pressure at the rear of the back pressure adjustment unit.

The pressure meter may be disposed between the front of the back pressure adjustment unit and the orifice steam trap to measure pressure at the front of the back pressure adjustment unit.

The temperature meter and the pressure meter may be sequentially disposed behind the back pressure adjustment unit to measure temperature and pressure at the rear of the back pressure adjustment unit.

The temperature meter and the pressure meter may be sequentially disposed behind the back pressure adjustment unit to measure temperature and pressure at the rear of the back pressure adjustment unit.

The temperature meter may be disposed behind the back pressure adjustment unit to measure temperature at the rear of the back pressure adjustment unit.

The temperature meter may include one or more brackish water separation walls and a temperature sensor.

The temperature meter may have a pipe part and a frustoconical part protruding from the pipe part, the brackish water separation walls may be arranged in the pipe part and the frustoconical part, and the temperature sensor may be disposed on the frustoconical part.

The temperature meter may further include a display unit that receives temperature data measured by the temperature sensor and may display the data outside.

The pressure meter may be composed of a pipe part and a pressure gauge disposed on the pipe part.

The apparatus may further include a controller that receives any one or both of temperature data from the temperature meter and pressure data from the pressure meter and controls operation of an exhaust configuration (automatically controls a control valve).

Advantageous Effects

According to the present invention, because of the function and effect of being able to perform the functions of various models of orifice steam traps at a time, there is no need for selecting an orifice steam trap having an orifice hole suitable for calculated conditions, as in the related art.

Accordingly, there is no need for selecting an orifice diameter suitable for installation environment and it is possible to discharge various amounts of condensate water.

MODES OF THE INVENTION

Figure 1:
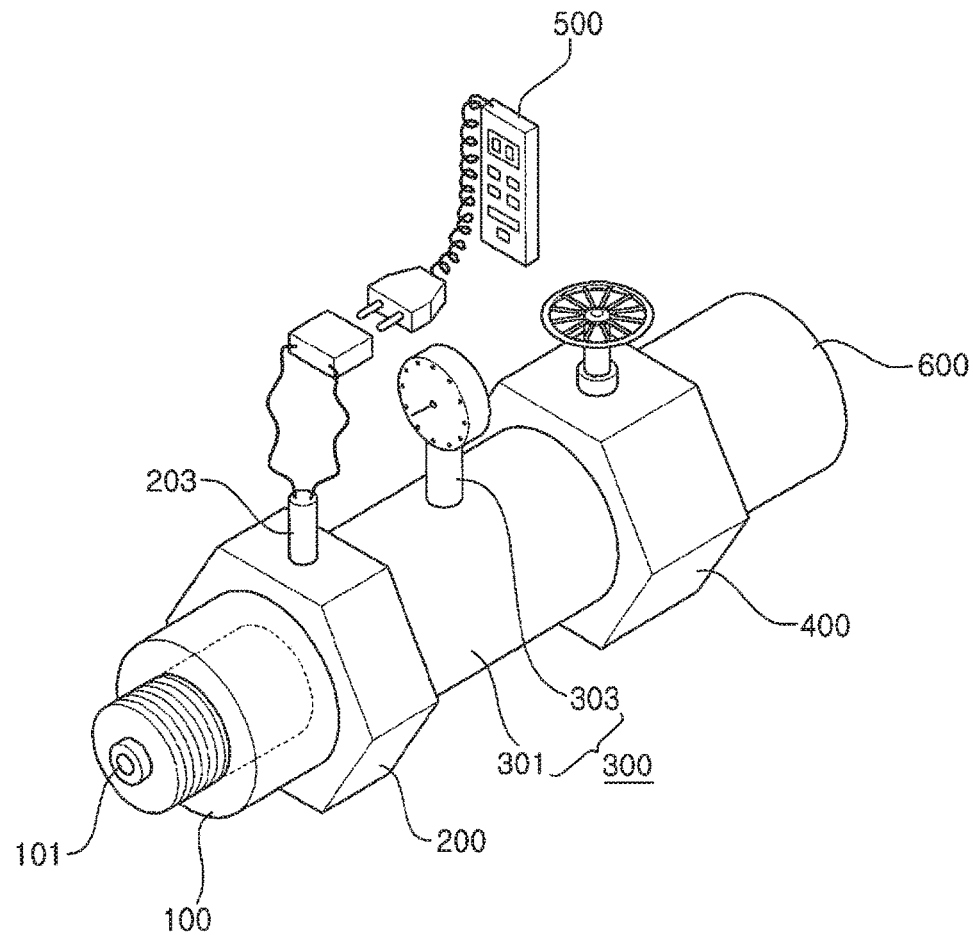
FIG. 1 is a view illustrating a multiple application orifice steam trap apparatus according to a first embodiment of the present invention.

Hereinafter, exemplary embodiments of the present invention will be described in detail with reference to the accompanying drawings. The same components are given the same reference numeral at any ones in the drawings, if possible. Further, well-known functions and configurations that may unnecessarily make the spirit of the present invention unclear are not described in detail.

Figure 2:
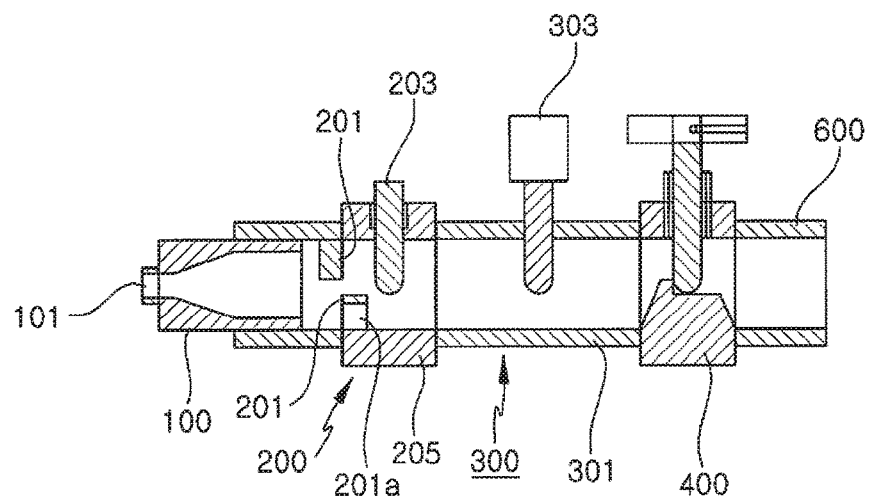
FIG. 2 is a view schematically illustrating a cross-section of FIG. 1.
Figure 3:
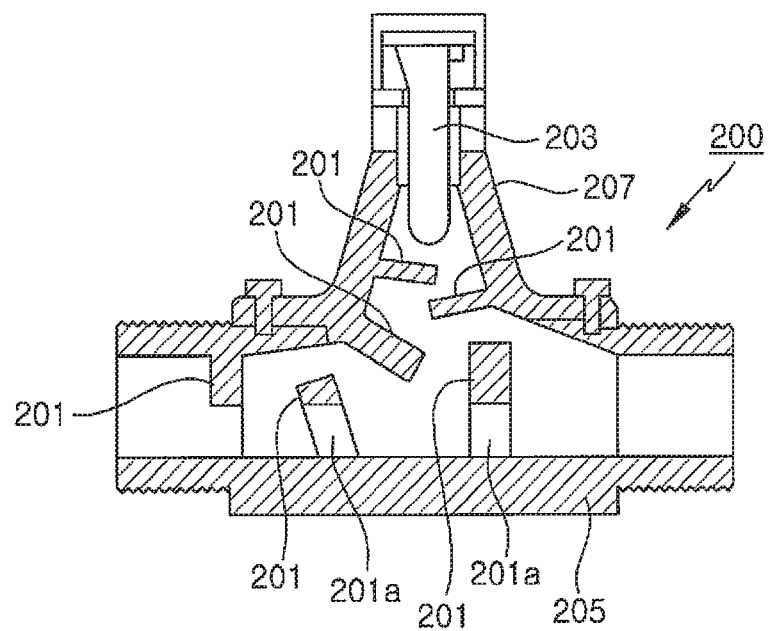
FIG. 3 is a cross-sectional view illustrating another embodiment of a temperature meter in the first embodiment of the present invention.

As illustrated in FIGS. 1 to 3, a multiple application orifice steam trap apparatus according to a first embodiment of the present invention (hereafter, referred to as a "first embodiment of the present invention") includes an orifice steam trap 100, a temperature meter 200, a pressure meter 300, and a back pressure adjustment unit 400, which are sequentially connected.

The orifice steam trap 100 has an orifice hole 101 at the front end and is connected to a live steam delivery pipe (steam pipe) to prevent leakage of live steam and discharge only condensate water, which is well known in the art. The orifice steam trap 100 has threads to be detachably coupled to a steam pipe.

The back pressure adjustment unit 400 connected to the rear end of the orifice steam trap 100 prevents a pressure drop in the orifice steam trap 100 and maintains back pressure at the rear end of the orifice steam trap 100 at a predetermined level by interfering with flow of condensate water passing through the orifice hole 101.

The back pressure adjustment unit 400 is a common valve and maintains the back pressure of the orifice steam trap 100 at a predetermined level by opening/closing the passage through which condensate water flows.

The temperature meter 200 checks whether the back pressure adjusted by the back pressure adjustment unit 400 is effective by measuring temperature at the rear end of the orifice steam trap 100. When the back pressure of the orifice steam trap 100 is not adjusted by the back pressure adjustment unit 400, live steam leaks with condensate water through the orifice steam trap 100.

The temperature meter 200 measures the temperature at the rear end of the orifice steam trap 100 through which condensate water and live steam leak and displays the measured temperature data, for example, on a display unit 500 such as a digital thermometer or a computer using characters or numbers. When the back pressure adjustment unit 400 is operated to interfere with the flow of condensate water and the back pressure is adjusted, leakage of live steam from the orifice steam trap 100 is stopped and the temperature meter 200 displays temperature lower than the temperature when the live steam leaks on the display unit 500.

When the temperature displayed on the display unit is maintained at a predetermined level, it means that live steam does not leak from the orifice steam trap 100, so the operation of the back pressure adjustment unit 400 is stopped and a predetermined back pressure is maintained. The pressure meter 300 measures and displays the pressure that is generated at the rear end of the orifice steam trap 100. The pressure meter 300 is a common device composed of a pipe 301 and a pressure gauge 303 installed on the pipe 301.

The pressure (originally existing vapor supply pressure) of the live stream generated at the front end of the orifice steam trap 100 drops while the live steam passes through the orifice steam trap 100, and when the pressure that drops is adjusted by the back pressure adjustment unit 400, the pressure meter 300 checks whether the back pressure at the rear end of the orifice steam trap 100 is an appropriate pressure and the temperature meter 200 checks whether the temperature is over saturation temperature at the back pressure adjusted by the back pressure adjustment unit 400.

Accordingly, the temperature meter 200 and the pressure meter 300 provide data on the basis of which it is possible to check whether the back pressure adjusted by the back pressure adjustment unit 400 is pressure suitable for preventing leakage of the live steam.

The first embodiment of the present invention which is operated in this way can be installed at any places without restrictions in installation environment and can discharge only condensate water without leakage of live steam.

The temperature meter 200 accurately measure the temperature of live steam by separating the live steam from condensate water, whereby it is possible to effectively check whether live steam leaks from the orifice steam trap 100.

The temperature meter 200 includes one or more brackish water separation walls 201 and a temperature sensor 203, and as the brackish water separation walls 201 separate live steam and condensate water, the temperature sensor 203 can accurately measure the temperature of only the live steam.

As illustrated in FIG. 2, the temperature meter 200 has the brackish water separation walls 201 alternately protruding up and down inside a pipe part 205 and a hole 201a for discharge condensate water is formed at the brackish water separation wall 201 at the lower portion inside the pipe part 205.

Condensate water is liquid and vapor re-vaporizing from the condensate water is sprayed in the types of water molecules, so the condensate water and the re-vaporizing vapor liquefy and come out of the pipe part 205 while passing through the brackish separation walls 201.

Live steam is in a gas state, so it passes through the brackish water separation walls 201 without liquefying. Accordingly, the temperature sensor 203 can accurately measure the temperature of only live steam, so it is possible to effectively check whether live steam leaks from the orifice steam trap 100.

Further, as illustrated in FIG. 3, the temperature meter 200 has a frustoconical part 207 protruding from the pipe part 205 and the brackish water separation walls 201 may be arranged in the pipe part 205 and the frustoconical part 207. The temperature sensor 203 is disposed on the frustoconical part 207.

Condensate water and re-vaporizing vapor liquefy while passing through the brackish separation water walls 201 in the pipe part 205 and re-vaporizing vapor that may be included in the live steam rising into the frustoconical part 207 is completely liquefied by the brackish water separation walls 201 in the frustoconical part 207.

As a result, only live steam exist at the upper portion in the frustoconical part 207 and the temperature sensor 203 can accurately measure the temperature of only live steam, so it is possible to effectively check whether live steam leaks from the orifice steam trap 100.

The live steam leaking from the orifice steam trap 100 is maintained at the same temperature as vapor that has been supplied, before it is influenced by a pressure change at the rear end of the orifice steam trap 100, that is, condensation and re-vaporization are generated, and whether the live steam leaks can be very accurately checked by measuring the temperature, that is, the temperature of the leaking live steam.

Though not illustrated, an exhaust configuration such as an air vent may be formed in the pipe part 205 or the frustoconical part 207. When live steam is saturated in the pipe part 205 or at the upper portion in the frustoconical part 207, new live steam leaking from the orifice steam trap 100 cannot rise to the temperature sensor 203. The exhaust configuration allows live steam that is continuously discharged to continuously rise to the temperature sensor 203 by discharging the existing live steam in the pipe 205 or at the upper portion inside the frustoconical part 207, so the temperature sensor 203 can continuously measure the temperature of the live steam.

The back pressure adjustment unit 400 may be disposed at the front end of the orifice steam trap 100, but it is advantageous to install the back pressure adjustment unit at the rear end under lower pressure in terms of reduction of friction.

The first embodiment of the present invention may include a controller such as a computer. The controller can automatically adjust back pressure by receiving in real time back pressure data and temperature data from the pressure meter 300 and the temperature meter 200 and operating the back pressure adjustment unit 400. The back pressure adjustment unit 400 may be an electronic valve, and the like.

Accordingly, back pressure can be automatically adjusted in real time, and accordingly, it is possible to efficiently maintain the performance of important equipment. The controller can receive temperature and pressure data signals and check whether the first embodiment of the present invention operates normally on the basis of the values of the signals, so it can remotely operate an alarming system and operate the back pressure adjustment unit 400 for normal operation.

Figure 4:
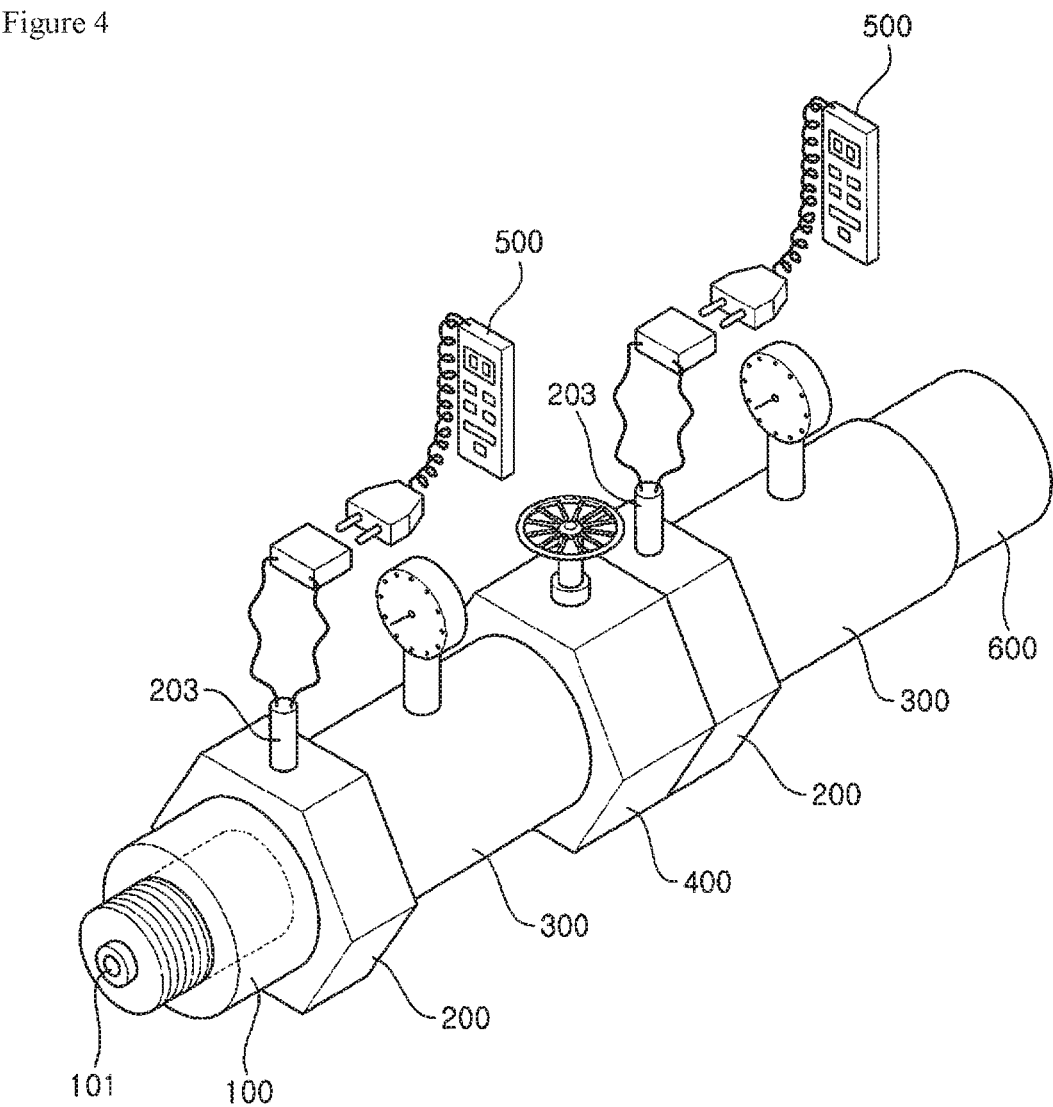
FIG. 4 is a view illustrating a multiple application orifice steam trap apparatus according to a second embodiment of the present invention.

FIG. 4 is a view illustrating a multiple application orifice steam trap apparatus according to a second embodiment of the present invention.

As illustrated in FIG. 4, a multiple application orifice steam trap apparatus according to the second embodiment of the present invention (hereafter, referred to as a "second embodiment of the present invention") further includes a temperature meter 200 and a pressure meter 300 sequentially disposed behind the back pressure adjustment unit 400 of the first embodiment of the present invention.

That is, in the second embodiment of the present invention, an orifice steam trap 100, a temperature meter 200, a pressure meter 300, a back pressure adjustment unit 400, a temperature meter 200, and a pressure meter 300 are sequentially arranged.

The temperature meter 200 and the pressure meter 300 disposed behind the back pressure adjustment unit 400 are provided to check the pressure (hereafter, referred to as "secondary back pressure") applied to a condensate water return pipe 600 and check whether it is an appropriate temperature on the basis of the saturation temperature at the secondary back pressure when the temperature of condensate water that has passed through the back pressure adjustment unit 400 and the secondary back pressure are not known.

The temperature measured by the temperature meter 200 disposed ahead of the back pressure adjustment unit 400 is the same as or lower than the temperature at vapor pressure that has been supplied, and when the temperature is adjusted by the back pressure adjustment unit 400 to approach the temperature measured by the temperature meter 200 disposed behind the back pressure adjustment unit 400, live steam does not leak from the orifice steam trap 100.

Figure 5:
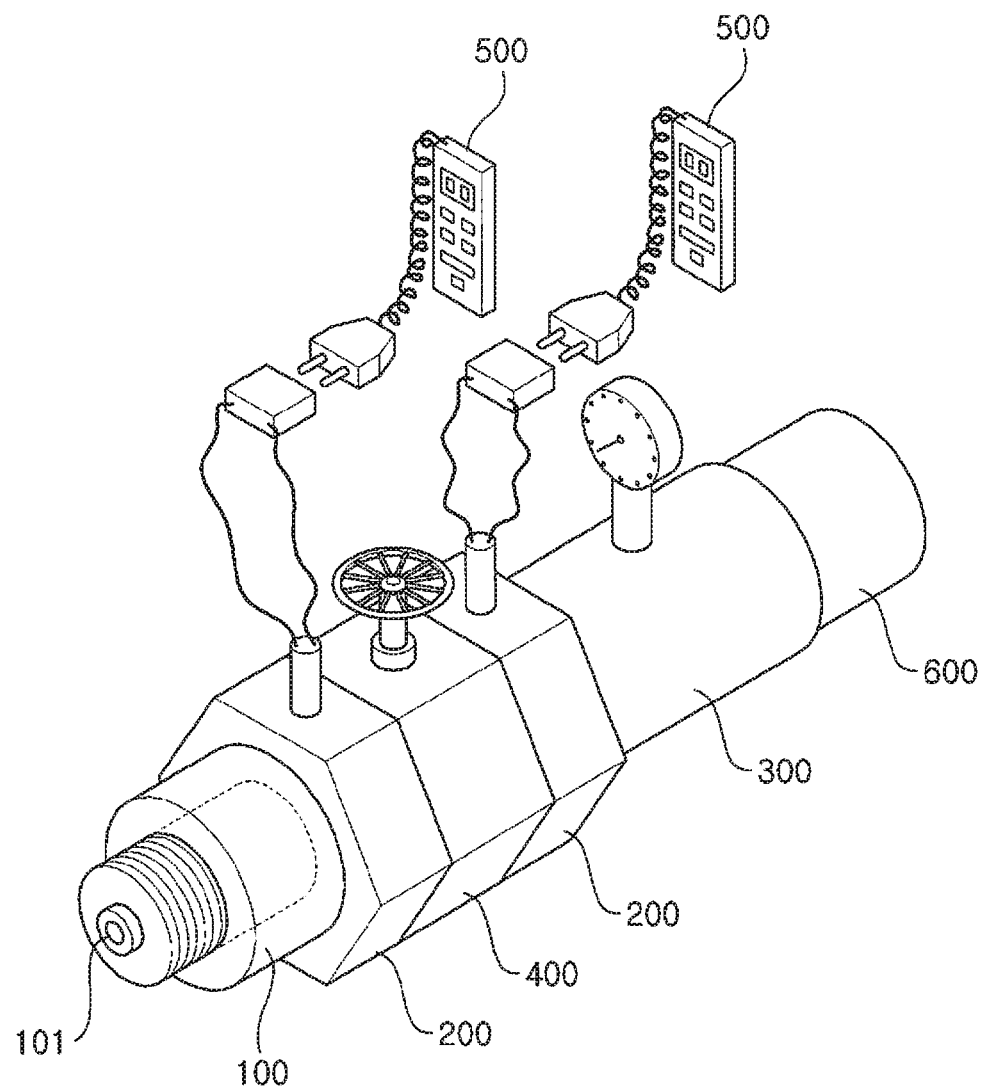
FIG. 5 is a view illustrating a multiple application orifice steam trap apparatus according to a third embodiment of the present invention.

FIG. 5 is a view illustrating a multiple application orifice steam trap apparatus according to a third embodiment of the present invention.

As illustrated in FIG. 5, in a multiple application orifice steam trap apparatus according to the third embodiment of the present invention (hereafter, referred to as a "third embodiment of the present invention"), only the pressure meter 300 disposed ahead of the back pressure adjustment unit 400 in the second embodiment of the present invention was removed.

That is, in the third embodiment of the present invention, an orifice steam trap 100, a temperature meter 200, a back pressure adjustment unit 400, a temperature meter 200, and a pressure meter 300 are sequentially arranged.

The third embodiment of the present invention checks whether the temperature measured by the temperature meter 200 disposed ahead of the back pressure adjustment unit 400 is an appropriate temperature by checking secondary back pressure generated behind the back pressure adjustment unit 400 and the saturation temperature at the secondary back pressure.

When the temperature measured by the temperature meter 200 disposed ahead of the back pressure adjustment unit 400 is the same as or lower than the temperature at vapor pressure that has been supplied and the temperature is adjusted by the back pressure adjustment unit 400 to approach the temperature measured by the temperature meter 200 disposed behind the back pressure adjustment unit 400, live steam does not leak from the orifice steam trap 100.

The third embodiment of the present invention is mixed with an existing steam trap (for example, a floating sphere type steam trap, and the like) that intermittently discharges condensate water in the same steam pipe, so it can find the highest temperature for a temperature change due to intermittent discharge of condensate water of the existing steam trap when the orifice steam trap 100 is installed.

Figure 6:
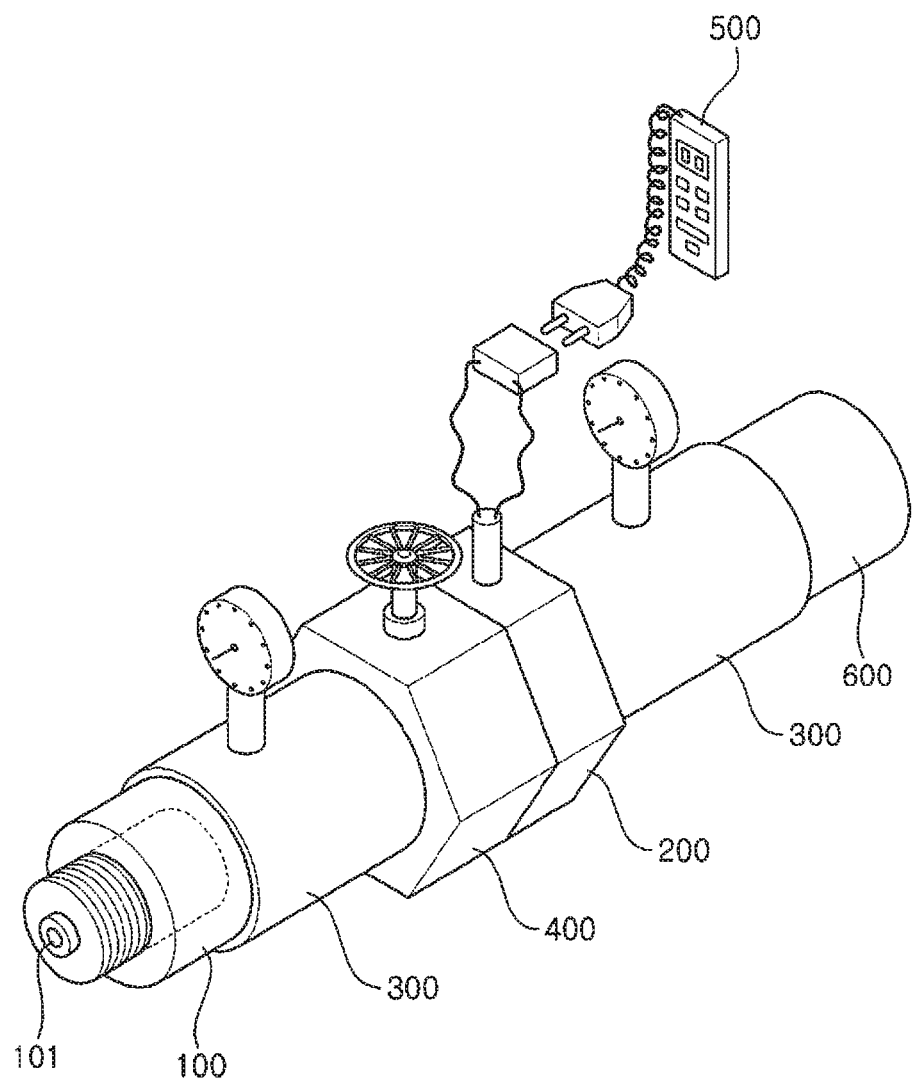
FIG. 6 is a view illustrating a multiple application orifice steam trap apparatus according to a fourth embodiment of the present invention.

FIG. 6 is a view illustrating a multiple application orifice steam trap apparatus according to a fourth embodiment of the present invention.

As illustrated in FIG. 6, in a multiple application orifice steam trap apparatus according to the fourth embodiment of the present invention (hereafter, referred to as a "fourth embodiment of the present invention"), only the temperature meter 200 disposed ahead of the back pressure adjustment unit 400 in the second embodiment of the present invention was removed.

That is, in the fourth embodiment of the present invention, an orifice steam trap 100, a pressure meter 300, a back pressure adjustment unit 400, a temperature meter 200, and a pressure meter 300 are sequentially arranged.

The fourth embodiment of the present invention checks whether the pressure measured by the pressure meter 300 disposed ahead of the back pressure adjustment unit 400 is an appropriate pressure by checking secondary back pressure generated behind the back pressure adjustment unit 400 and the saturation temperature at the secondary back pressure.

When the pressure measured by the pressure meter 300 disposed ahead of the back pressure adjustment unit 400 is lower than the vapor pressure that has been supplied and the pressure is adjusted by the back pressure adjustment unit 400 to approach the pressure measured by the pressure meter 300 disposed behind the back pressure adjustment unit 400, live steam does not leak from the orifice steam trap 100.

The fourth embodiment of the present invention is mixed with an existing steam trap (for example, a floating sphere type steam trap) that intermittently discharges condensate water in the same steam pipe, so it can find whether live steam leaks and the amount of leakage due to wear of the existing steam trap by finding a pressure change due to intermittent discharge of condensate water of the existing steam trap when the orifice steam trap 100 is installed.

Figure 7:
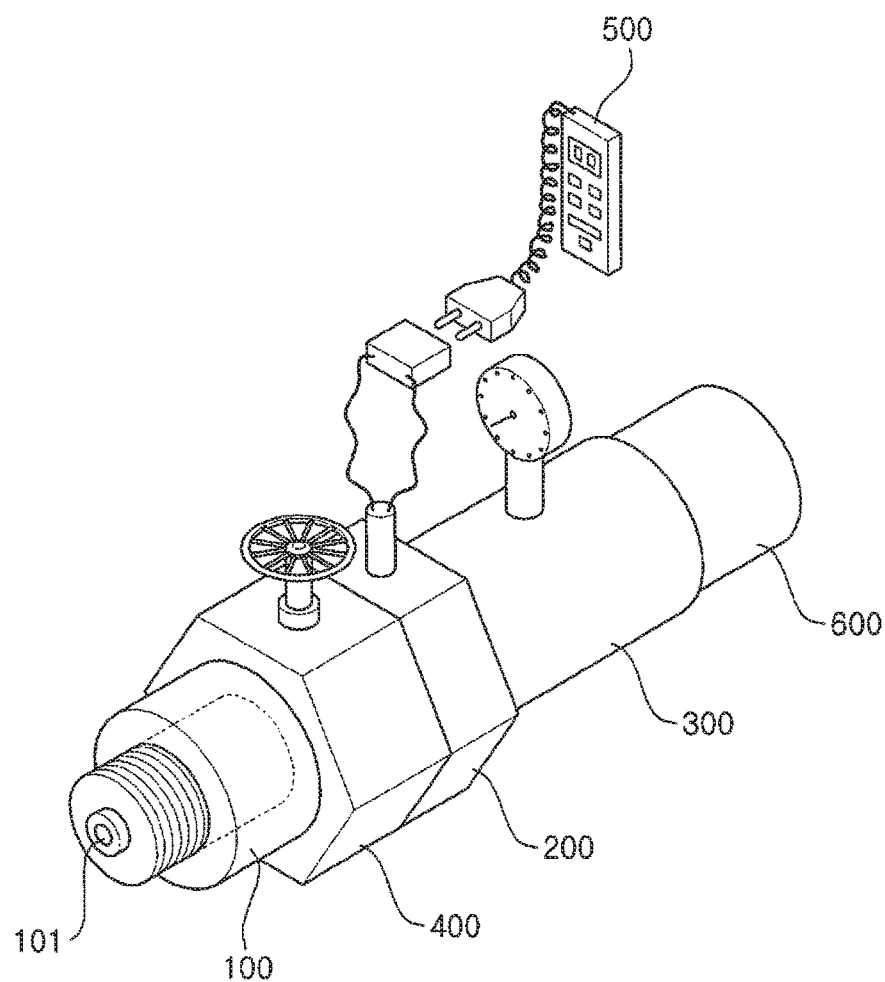
FIG. 7 is a view illustrating a multiple application orifice steam trap apparatus according to a fifth embodiment of the present invention.

FIG. 7 is a view illustrating a multiple application orifice steam trap apparatus according to a fifth embodiment of the present invention.

As illustrated in FIG. 7, in a multiple application orifice steam trap apparatus according to the fifth embodiment of the present invention (hereafter, referred to as a "fifth embodiment of the present invention"), both the temperature meter 200 and the pressure meter 300 disposed ahead of the back pressure adjustment unit 400 in the second embodiment of the present invention were removed.

That is, in the fourth embodiment of the present invention, an orifice steam trap 100, a back pressure adjustment unit 400, a temperature meter 200, and a pressure meter 300 are sequentially arranged.

The fourth embodiment of the present invention prevents live steam from leaking from the orifice steam trap 100 by decreasing temperature to an appropriate temperature on the basis of the saturation temperature at secondary back pressure by adjusting the back pressure adjustment unit 400 when there is less or no influence of an existing steam trap (for example, a floating sphere type steam trap, and the like) that intermittently discharge condensate water and when whether there is secondary back pressure is not known.

Figure 8:
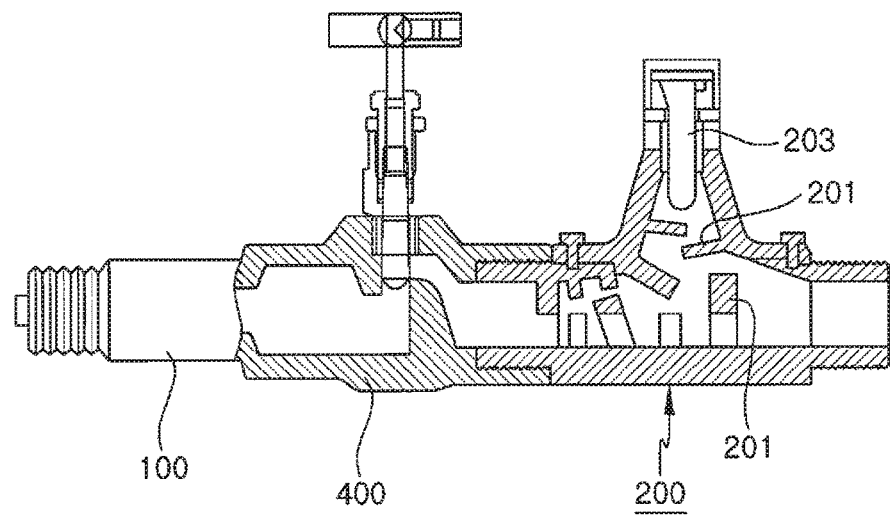
FIG. 8 is a view illustrating a multiple application orifice steam trap apparatus according to a sixth embodiment of the present invention.

FIG. 8 is a view illustrating a multiple application orifice steam trap apparatus according to a sixth embodiment of the present invention.

As illustrated in FIG. 8, in a multiple application orifice steam trap apparatus according to the sixth embodiment of the present invention (hereafter, referred to as a "sixth embodiment of the present invention"), only a temperature meter 200 is installed behind a back pressure adjustment unit 400.

The sixth embodiment of the present invention prevents live steam from leaking from the orifice steam trap 100 by adjusting the back pressure adjustment unit 400 to an appropriate temperature on the basis of the saturation temperature at secondary back pressure when the level of secondary back pressure is known or when it is made sure that there is no secondary back pressure.

According to the present invention, because of the function and effect of being able to perform the functions of various models of orifice steam traps at a time, there is no need for selecting an orifice steam trap having an orifice hole suitable for calculated conditions, as in the related art. Accordingly, there is no need for selecting an orifice diameter suitable for installation environment and it is possible to discharge various amounts of condensate water.

Although the present invention was described with reference to embodiments, various embodiments different from the above description of the present invention may be achieved by those skilled in the art within the scope of the present invention. The scope of the present invention is determined not by the examples, but by claims and all of differences within the equivalents should be construed as being included in the present invention.

The invention claimed is:

1. A multiple application orifice steam trap apparatus, comprising:
   an orifice steam trap that has an orifice hole and is connected to a live steam delivery pipe to prevent leakage of live steam and discharge only condensate water;
   a back pressure adjustment unit that is connected to the rear end of the orifice steam trap from which condensate water is discharged and adjusts back pressure of the orifice steam trap; and
   a meter disposed at any one of or both (a) between the front of the back pressure adjustment unit and the orifice steam trap and (b) at the rear of the back pressure adjustment unit, and the meter measures any one or both of temperature and pressure at any one or both of the front and rear of the back pressure adjustment unit, wherein the meter includes any one or both of a temperature meter and a pressure meter to measure any one or both of temperature and pressure, the temperature meter including:
   one or more brackish water separation walls,
   a temperature sensor,
   a pipe part, and
   a frustoconical part protruding from the pipe part, wherein the brackish water separation walls are arranged in the pipe part and the frustoconical part, and wherein the temperature sensor is disposed on the frustoconical part.

2. The apparatus of claim 1, wherein the back pressure adjustment unit is a valve.

3. The apparatus of claim 1, wherein the temperature meter and the pressure meter are sequentially disposed behind the back pressure adjustment unit to measure temperature and pressure at the rear of the back pressure adjustment unit.

4. The apparatus of claim 1, wherein the temperature meter is disposed behind the back pressure adjustment unit to measure temperature at the rear of the back pressure adjustment unit.

5. The apparatus of claim 1, wherein the temperature meter further includes a display unit that receives temperature data measured by the temperature sensor and displays the data outside.

6. The apparatus of claim 1, wherein the pressure meter is composed of a pipe part and a pressure gauge disposed on the pipe part.

7. The apparatus of claim 1, further comprising a controller that receives any one or both of temperature data from the temperature meter and pressure data from the pressure meter and controls operation of the exhaust portion.

8. The apparatus of claim 1, wherein the temperature meter and the pressure meter are sequentially disposed between the front of the back pressure adjustment unit and the orifice steam trap to measure temperature and pressure at the front of the back pressure adjustment unit.

9. The apparatus of claim 8, wherein the temperature meter and the pressure meter are sequentially disposed behind the back pressure adjustment unit to measure temperature and pressure at the rear of the back pressure adjustment unit.

10. The apparatus of claim 1, wherein the temperature meter is disposed between the front of the back pressure adjustment unit and the orifice steam trap to measure temperature at the front of the back pressure adjustment unit.

11. The apparatus of claim 10, wherein the temperature meter and the pressure meter are sequentially disposed behind the back pressure adjustment unit to measure temperature and pressure at the rear of the back pressure adjustment unit.

12. The apparatus of claim 1, wherein the pressure meter is disposed between the front of the back pressure adjustment unit and the orifice steam trap to measure pressure at the front of the back pressure adjustment unit.

13. The apparatus of claim 12, wherein the temperature meter and the pressure meter are sequentially disposed behind the back pressure adjustment unit to measure temperature and pressure at the rear of the back pressure adjustment unit.

\* \* \* \* \*